(12) United States Patent
Fejes

(10) Patent No.: US 6,628,758 B1
(45) Date of Patent: Sep. 30, 2003

(54) SYSTEM FOR ITEM SELECTION IN A TELEPHONY AUTO-ATTENDANT

(75) Inventor: Thomas Fejes, Nepean (CA)

(73) Assignee: Mitel Corporation, Ontario (CA)

( * ) Notice: Subject to any disclaimer, the term of this patent is extended or adjusted under 35 U.S.C. 154(b) by 0 days.

(21) Appl. No.: 09/294,175

(22) Filed: Apr. 19, 1999

(30) Foreign Application Priority Data

Apr. 17, 1998 (GB) .............................................. 9808178

(51) Int. Cl.⁷ ................................................ H04M 1/64
(52) U.S. Cl. .................. 379/67.1; 379/88.18; 379/88.22
(58) Field of Search ...................... 379/67.1, 68, 88.13, 379/88.18, 88.22, 915, 916, 917, 88.25

(56) References Cited

U.S. PATENT DOCUMENTS

| | | | |
|---|---|---|---|
| 4,649,563 A | | 3/1987 | Riskin |
| 4,677,659 A | | 6/1987 | Dargan |
| 4,696,028 A | | 9/1987 | Morganstein et al. |
| 4,716,583 A | * | 12/1987 | Groner et al. ........... 379/88.14 |
| 4,817,129 A | | 3/1989 | Riskin |
| 5,337,347 A | | 8/1994 | Halstead-Nussloch et al. |
| 5,446,882 A | * | 8/1995 | Capps et al. ............. 707/104.1 |
| 5,461,666 A | * | 10/1995 | McMahan et al. ........ 379/88.04 |
| 5,557,668 A | | 9/1996 | Brady ........................ 379/212 |
| 5,786,819 A | * | 7/1998 | Weiser et al. ................ 345/840 |
| 5,825,854 A | * | 10/1998 | Larson et al. ............. 379/88.14 |

FOREIGN PATENT DOCUMENTS

| | | | |
|---|---|---|---|
| EP | 0740447 A2 | 10/1996 | .......... H04M/1/274 |
| EP | 0876036 A2 | 11/1998 | .......... H04M/1/274 |
| EP | 0915604 A2 | 5/1999 | .......... H04M/1/274 |
| GB | 2329298 A | 3/1999 | |
| WO | WO9424806 | 10/1994 | |

* cited by examiner

Primary Examiner—Fan Tsang
Assistant Examiner—S P Sing

(57) ABSTRACT

An automated telephone directory system allows a caller to select an item from a list in a telephony interface by assigning predetermined navigational functions to respective caller keypad entries for navigating through the list; assigning a selection function to a further caller keypad entry; communicating an initial item in the list to the caller; receiving a signal representing an input caller keypad entry and i) in the event said signal representing said input caller keypad entry corresponds to one of the predetermined caller keypad entries then navigating to a further item in the list and communication said further item to said caller, and ii) in the event said signal representing said input caller keypad entry corresponds to the selection function then selecting said item from said caller.

2 Claims, 3 Drawing Sheets

SYSTEM FOR ITEM SELECTION IN A TELEPHONY AUTO-ATTENDANT

FIELD OF THE INVENTION

This invention relates in general to automated attendant telephony directory systems and more specifically to an inventive combination of a directory system providing a non-linear search and an intuitive navigation scheme.

BACKGROUND OF THE INVENTION

Automated telephony attendant systems are known in the art for answering telephone calls and for helping to direct a caller to a requested party. Such systems allow the caller to call and contact or leave a message for an employee at any time during the day without having to worry about the message not being received.

One feature of some prior art automated telephony attendant systems is the ability of a caller to select items (e.g. persons or departments) without human intervention. According to one type of item selection telephony interface, the caller spells the name or title of an item using a telephone keypad. Speech recognition can alternatively be employed where the caller speaks the name or title of the item and the system selects the correct item. In some systems, a sequential listing of all items is played to the caller along with an indication of which digits must be entered in order to select each item. Some prior art systems employ a combination of these techniques for item selection.

One problem with the first mentioned prior art item selection technique is the difficulty experienced by many callers in mentally translating a name from letters to numbers in accordance with the keypad on a telephone. It is quite difficult for many callers to perform this instantaneously. Also, in some countries, telephones do not include letters on the keypad. Speech recognition technology is not sufficiently well developed to function accurately with different timbres of input voice, accents, speech impediments, etc. In connection with the last mentioned item selection technique, there is also a problem of forcing the caller to spend a considerable amount of time listening to the list if the required item is at the end.

SUMMARY OF THE INVENTION

According to the present invention, an automated telephony attendant is provided in which a caller is presented with an opportunity to select an item from a list of items (e.g. the name of an employee in a company). For example, a list of employee names may be stored in a database (often a long list) and communicated to the caller using text-to-speech or prerecorded voice. Telephone keypad inputs are used to navigate the caller to different locations in the list (e.g. 'To move forward in the list press "3", to move backward in the list press "1"'). Functional keypad navigation allows the caller to jump to the start of the list, to the end of the list, forward or backward.

The present invention provides a unique algorithm implemented in a telephony interface for browsing items in an item list, which overcomes the prior art problems discussed above. Firstly, callers are not required to mentally translate a name from letters to numbers in order to arrive at the correct item. There is no requirement for complex and unreliable voice recognition systems. Also, callers may simply navigate through the list using predefined forward and backward navigational function keys, rather than having to listen to the entire list.

According to one aspect of the present invention, there is provided a method for allowing a caller to select an item from a list in a telephony interface comprising the steps of:
a) assigning predetermined navigational functions to respective caller keypad entries for navigating through said list;
b) assigning a selection function to a further caller keypad entry;
c) playing an initial item in said list to said caller;
d) receiving a signal representing an input caller keypad entry and
  i) in the event said signal representing said input caller keypad entry corresponds to one of said predetermined caller keypad entries then navigating to a next item in said list and playing said next item to said caller, and
  ii) in the event said signal representing said input caller keypad entry corresponds to said selection function then selecting said item for said caller.
e) in the event no signal representing an input caller keypad entry is received from said caller then navigating to the next item automatically.

According to a second aspect of the present invention, there is provided a telephony interface item selection system comprising:
  a database containing an item list; and
  a computer program for communicating items in said list to a caller, for associating keys from a telephone keypad with specific navigational functions, and for receiving and translating keypad entries from said caller into predetermined ones of said navigational functions and in response navigating to predetermined locations in said list for communicating items at said predetermined locations.

BRIEF DESCRIPTION OF THE DRAWINGS

A preferred embodiment of the invention is described below with reference to the drawings, in which.

DETAILED DESCRIPTION OF THE PREFERRED EMBODIMENT

Figure 1:
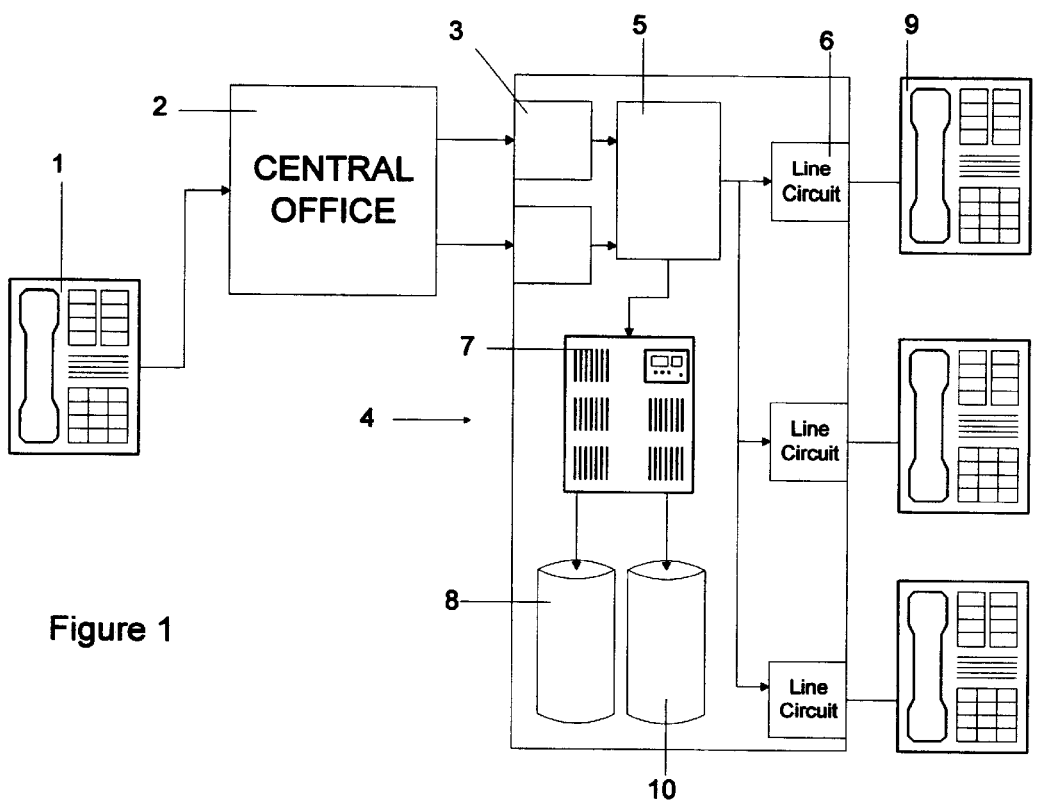
FIG. 1 is a schematic diagram showing the overall architecture of the present invention.

Turning to FIG. 1, a schematic diagram of the overall architecture is shown for implementing the item selection interface of the present invention. An external telephone 1 places a call through a Central Office 2. The Central Office 2 forwards the call to a trunk circuit 3 within a PBX 4 of, for example, a company. The phone call is routed via a cross point switching matrix 5 to a predetermined one of a plurality of line circuits 6 under control of a main controller 7. The main controller 7 contains a database and a set of tables 8 and a computer program 10 which implements the present invention. After the caller has selected an item (e.g. department or an employee), the computer program 10 informs the main controller 7 of the selected item which, in turn, configures the switching matrix 5. The switching matrix 5 proceeds to transfer the call, to the line circuit 6 associated with the selected item. The line circuit 6 transfers the call to a telephone 9 (or other telephony peripheral) associated with the selected item. It is contemplated that the selected item may be something other than an employee or department. For example, the selected item may be a pre-recorded announcement in a bulletin board system, or may initiate a procedure for automatic merchandise ordering or bill payment, etc.

The computer program 10 for the item selection system is written in Visual Basic in the preferred embodiment. The computer program is attached hereto as Appendix A.

Figure 2:
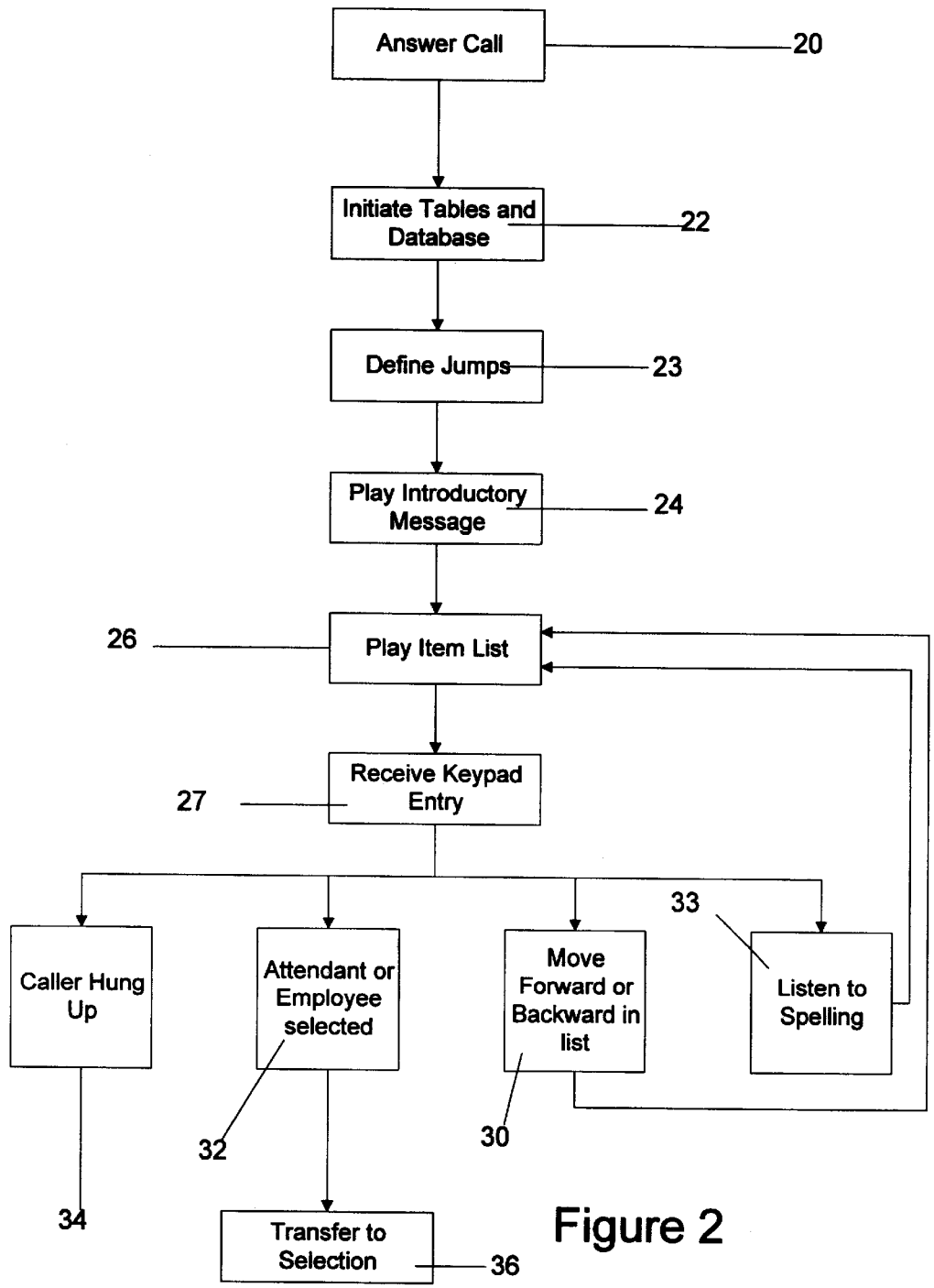
FIG. 2 is a flowchart showing the process by which an automated telephone attendant transfers a caller to a requested telephone extension in accordance with the preferred embodiment of the present invention.

Turning to FIG. 2, a flowchart is provided showing the process by which an automated telephony attendant transfers a caller to a requested telephone extension in accordance with the preferred embodiment of the present invention. In this embodiment, item selection is implemented using pre-determined navigational keys according to the key aspect of the invention along with a dial-by-name feature.

At step 20, an incoming telephone call is answered by the automated telephony attendant (using the command Voice1. Pickup Appearance) and the item selection system of computer program 10 is started (using the command DBNStart).

The item selection system proceeds to initialize variables, the database and the set of tables 8 (step 22) through a series of commands. The commands to initialize the database and the tables are Set MyDb=DBEngine.Workspace(0) .OpenDatabase(_"C:MyDocuments/newlocate.MDB") and Set MyTable=MyDb.OpenRecordset ("TomDirectory", dbOpenTable) respectively. In the preferred embodiment, the items in the database are employee names in a company. Possible variables included in the table are the employee's last name, first name, pronunciation of first and last names and extension number. In order to implement the item selection system by last name, the command MyTable. Index="LastName" is used.

The system then proceeds, at step 23, to define jumps (based on-the size of a list of employee names) to help the caller move quickly through the list. The program finds the number of entries in the list and defines three different sized jump values as SmallMove, MediumMove and BigMove, discussed herein below.

Subsequently, the item selection system initiates a speech system (with the command hTts=TtsInit ( )) and plays a previously entered introductory message for the caller (step 24). The command for playing the introductory message is PlayText Voice1, hTts, TextToSpeak, where TextToSpeak allows the owner of the system to select the speed by which the caller hears the introductory message and to customize a previously entered introductory message.

After the caller hears the introductory message, the item selection system plays the list of selectable items for the caller at step 26. Due to a feature in Visual Basic (the preferred computer language of the present invention), the list plays in a loop (i.e. when the item selection system has reached the end of the list, the item selection system loops back to the beginning and plays the list over again.)

The caller uses the keypad of the telephone set 1 to navigate through the list (step 27). The function Function ProcessKey (key As String, keysSoFar As String) As String is called to handle the keypad entry of the caller. The function receives the keypad input from the caller and uses a case statement to match the entry with the correct action. For instance, if the caller depresses the "2" on the keypad, the procedure "Select" is run, as described herein below.

The caller may move forward in the list by pressing a designated forward key (chosen as "3" or "6" in the preferred embodiment) or move backward in the list by pressing a designated back key (chosen as "1" or "4" in the preferred: embodiment) at step 30, make a selection by pressing a designated selection key (chosen as "2" in the preferred embodiment) or go to a human attendant by pressing a selected attendant key (chosen as "0" in the preferred embodiment) at step 32, or listen to the spelling of the last name of an employee by pressing a designated spell key (chosen as "5" in the preferred embodiment) at step 33.

The command PlayText Voice1, hTts, MyTable!Last-Name & "is spelled" & SpellString(MyTable!LastName) is used instep 32 to spell out the last name of a chosen employee by the caller. After spelling the name, the item selection system returns to step 26 and continues to play the list.

Hanging up of the phone by the caller terminates the call at step 34. To ensure that hanging up by a caller terminates the telephone call, a command Do Until MyTable.EOF And Not Hangup is called after the introductory message has been played.

Figure 3:
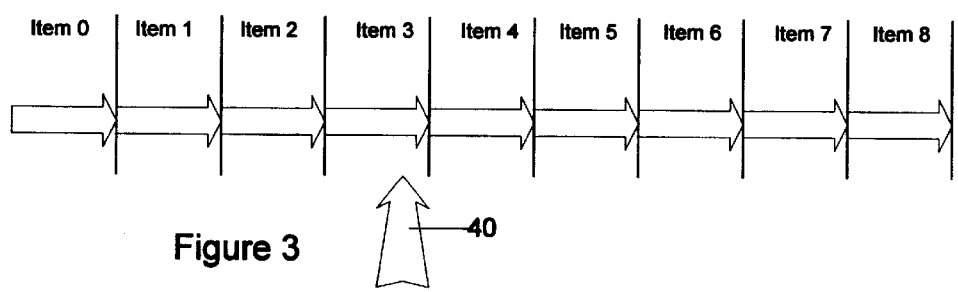
FIG. 3 is a schematic representation showing how the functional navigation keys operate.

An example will now be described with reference to FIG. 3 wherein the value of SmallMove has been defined as 2, the value of MediumMove defined as 3 and the value of BigMove defined as 10. If, following the answering of an incoming call by the system, the caller decides to navigate through the list (step 30), the caller has the option to go forward in the list by depressing the "3" or the "6" key on the keypad in the preferred embodiment. In FIG. 3, a pointer 40 is used to indicate the current position in the item list.

By depressing the "6" key once, the caller moves to the next item in the list. Therefore if the pointer 40 is initially pointing at Item 3, the pointer will jump to Item 4.

By depressing the "3" key once, the caller moves forward by a first predetermined number of items in the list. This predetermined number is the value SmallMove defined above. Therefore, if the pointer 40 is initially pointing at Item 3, the pointer will jump to Item 5.

By depressing the "3" key twice, the caller moves forward by a second predetermined number of items in the list where the predetermined value is the value MediumMove defined above. Therefore, if the pointer is initially pointing at Item 3, the pointer will jump to Item 6.

By depressing the "3" key thrice, the caller moves forward by a third predetermined number of items in the list where the predetermined value is the value BigMove defined above. Therefore, if the pointer is initially pointing at Item 3, the pointer will jump to the end of the list.

It is clear from the names of these three variables that the value of MediumMove is greater than the value of Small- Move and similarly that the value of BigMove is greater than the value of MediumMove.

Depression of the "4" key and the "1" key (in the preferred embodiment) moves the caller backward in the list by the same predetermined values as the "6" and the "3" keys moves the caller forward in the list. If the caller depresses either the "1" key or the "3" key, the ProcessKey function waits for one second before running the selected command. The one second delay allows the caller to depress the "1" or "3" key again in order to make a bigger jump. After the jump value has been selected, the program performs the jump and the caller is returned to step 26 to play more selectable items starting from the new position.

Returning to FIG. 2, if the caller selects the human attendant (by depressing the "0" key) or selects an employee (by depressing the "2" key), the caller is then transferred to the selected employee or attendant (step 36). In the case that the caller has chosen to be connected with the attendant, a procedure command Attendant is called. The procedure Attendant finds the item attendant or human attendant in the table and calls a FoundName procedure. In the case that the caller has selected an item (or a name in the preferred embodiment), the procedure Select is called. The procedure Select is a set of commands Selection=MyTable! ID and Goto FoundName are called. The system then transfers the caller to the selected employee using the FoundName procedure. The FoundName procedure also pronounces the selected name to the caller using the command PlayText Voice1, hTts, "Transferring to " & TextToSpeak & "at extension " & Left$(MyTable!PhoneNum, 4) 2) &_"" & Right$(Right$(MyTable!PhoneNum, 4), 2), where TextToSpeakis the name of the selected employee and then connects to the correct extension number via the command Voice1.Transfer MyTable!PhoneNum.

The speech system then shuts down using the command TtsUninit (hTts) and the tables are closed using the command MyTable.Close.

The telephone call is terminated using the commands Voice1.Stop and Voice1.HangUp It will be appreciated that, although a particular embodiment of the invention has been described and illustrated in detail, various changes and modifications may be made. One such change is in the name of the variables within the computer program. Provided that all name changes are made globally (i.e. throughout the program), the program will function in the same manner. A second modification is in the way the list is assembled. In the preferred embodiment, the list is created using individual recordings for each item but a text-to-speech system may be used or a single continuous reading may be made for the entire list. The user has the option to use either a text to speech system or to use pre-recorded or voice or a combination of both in creating the list, table and messages. In the case of a continuous list, the variables SmallMove, MediumMove and BigMove must be time based and not based on the number of items in the list. A third possible modification relates to the choice of keys which are used for modification. They are definable to meet the specification of the owner of the system. In the preferred embodiment, the keys "1", "2", "3", "4", "5", "6" and "0" are used. It may be desirable in some systems to have "3" defined as SmallMove, "6" as MediumMove and "9" as BigMove as the defined forward keys. An alternative form of keypad navigation may be to restrict the search, such as, by firstly pressing a number corresponding to the first letter of the last name of the requested party (e.g. the caller first pressed the key "7" associated with the letter "R", for navigating only last names starting with "R" ). Also, whereas the example discussed herein addresses the situation where the caller is located remotely from the PBX 4 (i.e. connected via the central office 2), the system of the present invention may be implemented within PBX 4 so that a caller at an extension is able to navigate through a list to find a person at another extension. Furthermore, whereas the preferred embodiment sets forth an implementation with a PBX 4, the system of the present invention may also be implemented in a call server or voice-LAN environment. All such changes and modifications may be made without departing from the sphere and scope of the invention as defined by the claims appended hereto.

APPENDIX A

```
Option Explicit
Public ghangup As Boolean
Function ProcessKey (key As String, keysSoFar As String)
    As String
    Dim Command As String
    'Process the key that was just entered in the context of the
        keys
    'that have been entered so far.
    'Note: the 'key' parameter is"" when no key was entered
        within the
    'timeout period.
    Command=""
    Select Case keysSoFar
    Case""
        Select Case key
        Case ""
            Command="Forward1" 'Go forward if nothing was
                pressed.
        Case "2"
            Command="Select"
        Case "5"
            Command="Spell"
        Case "8"
            Command="AdjustPronunciation"
        Case "0"
            Command="Attendant"
        Case "4"
            Command="Backward1"
        Case "6"
            Command="Forward1"
        Case "1"
            'Wait for next key
        Case "3"
            'Wait for next key
        Case Else
            Command="Invalid"
        End Select
    Case "1"
        Select Case key
        Case "1"
            'Wait for next key
        Case Else
```

```
            Command="Backward2"
        End Select
    Case "3"
        Select Case key
            Case "3"
                'Wait for next key
            Case Else
                Command="Forward2"
        End Select
    Case "11"
        Select Case key
            Case "1"
                'Wait for next key
            Case Else
                Command="Backward3"
        End Select
    Case "33"
        Select Case key
            Case "3"
                'Wait for next key
            Case Else
                Command="Forward3"
        End Select
    Case "111"
        Select Case key
            Case "1"
                Command="Backward4"
            Case Else
                Command="Backward4"
        End Select
    Case "333"
        Select Case key
            Case "3"
                Command="Forward4"
            Case Else
                Command="Forward4"
        End Select
    End Select
    keysSoFar=keysSoFar & key
    ProcessKey=Command
End Function
Sub DBNStart( )
    'Variable declarations
    Dim MyDb As Database, MyTable As Recordset
    Dim hTts As Long
    Dim key As String
    Dim Total As Long
    Dim Command As String
    Dim SoFar As String
    Dim Selection As String
    Dim TextToSpeak As String
    Dim Pronunciation As String
    Dim SmallMove As Integer
    Dim MediumMove As Integer
    Dim BigMove As Integer
    Dim esc As String
    Dim modeSpell As String
    Dim modeNormal As String
    Dim speedFast As String
    Dim speedNormal As String
    'Set defaults and constants
    esc=Chr$(27)
    modeSpell=esc & "M0"
    modeNormal=esc & "M2"
    speedFast=esc & "R7"
    speedNormal=esc & "R5"
    Set MyDb=Nothing
    Set MyTable=Nothing
    'Define error handler
    On Error GoTo err_dbnstart
    gHangup=False
    'Initialize database and open the table we're going to use.
    'Note: The table has the following fields:
    'LastName last name of user (used when speaking the
        name)
    'FirstName first name of user (used when speaking the
        name)
    'Pronunciation optional pronunciation of full name (if this
        field
    'is present, the speech system will speak this value
    'instead of the combination of FirstName and LastName)
    'PhoneNum extension of the user (destination of transfer)
    'Set MyDb=DBEngine.Workspaces(0).OpenDatabase(_
        "C:/My Documents/newlocate.MDB")
    Set MyTable=MyDb.OpenRecordset("TomDirectory",
        dbOpenTable)
    'Inform database that lookup will be based on lastname
    MyTable.Index="LastName" 'Set current index.
    'Determine the number of names in the database and move
        to first entry
    MyTable.MoveLast
    Total=MyTable.RecordCount
    MyTable.MoveFirst
    'Determine the size of the various jumps based on the
        number of names
    SmallMove=5
    MediumMove=20
    BigMove=Int(Total/2)
    If BigMove<MediumMove Then
        BigMove=MediumMove+1
    End If
    'Initialize speech system
    hTts=TtsInit( )
    'Play introductory message
    TextToSpeak=speedFast & "You will be presented with a
        list" &_
        "of all the people in the company in alphabetical order."
            &_
        "To move forward in the list press 3. To move back-
            ward" &_
        "in the list press 1. Press the keys multiple times to "
            &_
        "move quicker. To move forward one entry at a time
            press 6." &_
        "To move backward one entry at a time press 4." &_
        "To make a selection press 2. To transfer" &_
        "to the attendant, press 0."
    PlayText Voice1, hTts, TextToSpeak
    'Keep playing names until we reach the end of the list or
    'the caller hangs up.
    Do Until MyTable.EOF And Not gHangup
        DoEvents 'This is required for Visual Basic to process
            other 'events while in this loop.
```

```
'Determine how the current name should be pro-
    nounced.
If Trim(MyTable!Pronunciation) < >"" Then
    'Use the optional pronunciation field if present
    TextToSpeak Trim(MyTable!Pronunciation)
Else
    'Otherwise speak the first and last name
    TextToSpeak=MyTable!FirstName & "" &
        MyTable!LastName
End If
'Speak the current name
PlayText Voice 1, hTts, TextToSpeak
'Begin waiting for digits from the keypad and after each
    digit is
'hit, process that key to see if it makes up a command.
Command=""
SoFar=""
While Command=""
    'Wait for 1 digit from the caller. Timeout after 1
        second.
    key=Voice1.GetDigits(1,"", 1, 1)
    Debug.Print "key: " & key &"sofar: '"& SoFar &'""
    Command=ProcessKey(key, SoFar)
Wend
Debug.Print Command
'Based on the command, determine what to do. For
    instance, move
'forward or backward in the list some amount
    (depending on the 'key(s) pressed by the caller).
    Also, the caller may have made a 'selection from the
    items in the list. Features were added to 'allow the
    caller to listen to the spelling of the current last 'name
    that was played, and (exclusively for this debug
    version) 'an option to allow the administrator to
    adjust the pronunciation 'of any name on the fly.
Select Case Command
Case "Forward1"
    RSMoveRelative MyTable, 1
Case "Forward2"
    RSMoveRelative MyTable, SmallMove
Case "Forward3"
    RSMoveRelative MyTable, MediumMove
Case "Forward4"
    RSMoveRelative MyTable, BigMove
Case "Backward1"
    RSMoveRelative MyTable, -1
Case "Backward2"
    RSMoveRelative MyTable, -SmallMove
Case "Backward3"
    RSMoveRelative MyTable, -MediumMove
Case "Backward4"
RSMoveRelative MyTable, -BigMove
Case "Spell"
    PlayText Voice1, hTts, MyTable!LastName &_
    "is spelled " & SpellString(MyTable!LastName)
Case "Select"
    Selection=MyTable!ID
    GoTo FoundName 'The caller has found a match!
Case "Invalid"
    Voice1.PlayFile "ding.wav"
Case "Attendant"
    GoTo Attendant
Case "AdjustPronunciation"
    MyTable.Edit
    Pronunciation=MyTable!Pronunciation
    Debug.Print ""& Pronunciation &""
    MyTable!Pronunciation=InputBox
        (MyTable!FirstName &" " &_
            MyTable!LastName, "Pronunciation",
                Pronunciation)
    MyTable.Update
Case Else
    Voice1.PlayFile "ding.wav"
End Select
Loop 'End of loop.
'Caller has chosen to go to the human attendant.
Attendant:
    Dim currentPos As String
    'Search for the record of the human attendant in the
        database
    MyTable.Index="LastName" 'Set current index.
    MyTable.MoveFirst
    'Find entry with last name: 'attendant' and first name:
        'human'
    MyTable.Seek "=", "attendant"
    If Not MyTable.NoMatch Then
        Do Until MyTable!LastName < >"attendant"
            If MyTable!FirstNaine="human" Then GoTo
                FoundName
            MyTable.MoveNext
        Loop
    End If
    OutDebug "Name not found"
    PlayText Voice1, hTts, "Error locating anyone. Aborting."
    GoTo Done
'The current record points to the person that the caller
    selected, so
'initiate the transfer, but inform the caller first of the exten-
    sion
'to which he/she is being transferred.
FoundNarne:
    'Determine again how the current name should be pro-
        nounced.
    If Trim(MyTable!Pronunciation)< >""Then
        TextToSpeak=Trirn(MyTable!Pronunciation)
    Else
        TextToSpeak=MyTable!FirstNamne &" " & MyTable-
            !LastName
    End If
    'Tell the caller we're transferring to so-and-so at extension
    'this-and-this.
    PlayText Voice1, hTts, "Transferring to " & TextToSpeak
        &_
        "at extension " & Left$(Right$(MyTable!PhoneNum,
            4), 2) &_
        " " & Right$(Right$(MyTable!PhoneNum, 4), 2)
    'Do the transfer
    Voice1.Transfer MyTable!PhoneNum
Done:
    TtsUninit (hTts) 'Shutdown speech system
    MyTable.Close 'Close table.
    Exit Sub
'Error handler
err__dbnstart:
    If Err=94 Then
        'Invalid use of NULL
        Pronunciation
        Resume Next
    End If
    If Err< >vtpLineDropped Then MsgBox Error$
```

```
On Error Resume Next
If hTts< >0 Then
    TtsUninit (hTts)
End If
If Not MyTable Is Nothing Then
    MyTable.Close
End If
Exit Sub
End Sub
Private Sub Form_Unload(Cancel As Integer)
    'Stop all Visual Voice actions and release
    'the phone line
    Voice1.Stop
    Voice1.HangUp
End Sub
Private Sub Voice1_LineDropped( )
    'If the caller hangs up while a non-Visual Voice code is
        executing,
    'force the voice control to return a line dropped error when
        the
    'next Visual Voice method is executed (typically in the
        RingDetected
    'event or another procedure called by the RingDetected
        event)
    'Voice1.SetError vtpLineDropped
    gHangup=True
    Voice1.Stop
    Voice1.HangUp
    lblCallingNum.Caption=""
End Sub
Private Sub Voice1_Load(ByVal ErrorCode As Long,
    Response As Integer)
    'The phone line # may be passed as command line arg
        (e.g. myapp.exe 1)
    'via Visual Basic's Command$ function. Voice Monitor
        app automatically
    'starts Visual Voice applications on the appropriate phone
        line using
    'this method
    Dim LineNum As String
    If ErrorCode=0 Then 'No error occurred while loading the
        voice control
        If Command$="" Then
            'The phone line was not passed as command line
                argument
            LineNum=InputBox("Visual Voice line to use",
                "Choose Line", "4")
            If LineNum="" Then End
            Voice1.AllocateLine Val(LineNum)
        Else
            'It was passed in, so allocate the requested phoneline
                #
            Voice1.AllocateLine Val(Command$)
        End If
    End If
End Sub
Private Sub Voice1_RingDetected(ByVal Appearance As
    Integer)
On Error GoTo MainErr
    'Pick up ringing line
    Voice1.PickUp Appearance
    'Start the dial-by-namne feature
    DBNStart
    'Terminate the call
    Voice1.Stop
    Voice1.HangUp
    Exit Sub
MainErr:
    If Err< >vtpLineDropped Then MsgBox Error$
    Voice1.Stop
    Voice1.HangUp
    gHangup=True
End Sub
```

What is claimed is:

1. A method for allowing a caller to select an item from a list in a telephony interface comprising the steps of:
   a) assigning predetermined navigational functions to respective caller keypad entries for navigation through said list;
   b) assigning a selection function to a further caller keypad entry;
   c) communicating an initial item in said list to said caller;
   d) receiving a signal representing an input caller keypad entry and
      i) in the event said signal representing said input navigational functions corresponds to one of said predetermined caller keypad entries then navigating to a further item in said list and communicating said further item to said caller, and
      ii) in the event said signal representing said input caller keypad entry corresponds to said selection function then selecting said item for said caller;
   wherein said predetermined navigational functions include rig-forward movements, and backward movements throughout said list by predetermined amounts.
   wherein said predetermined amounts are based on a quantity of items in said list.

2. The method of claim 1 further comprising increasing said predetermined amounts by increments in response to repeated identical keypad entries by said caller within a predetermined time delay.

* * * * *